June 24, 1930. H. HEINRICH 1,767,884
THEFTPROOF TIRE VALVE CAP
Filed March 30, 1929
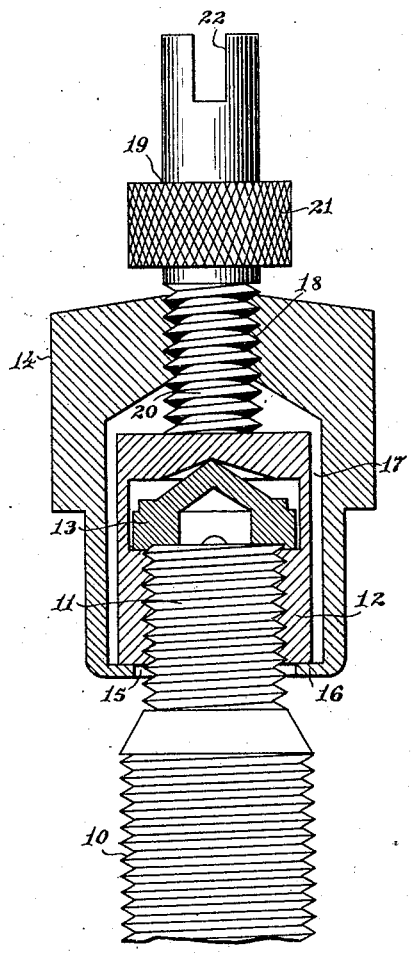
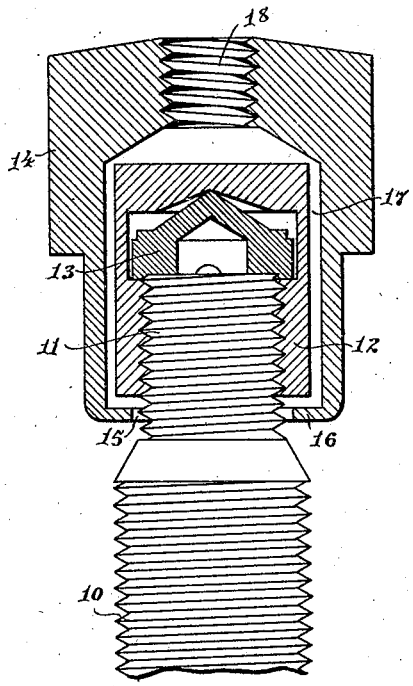
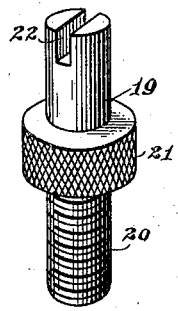
WITNESSES
INVENTOR
Harrison Heinrich
BY
ATTORNEYS Patented June 24, 1930

1,767,884

UNITED STATES PATENT OFFICE

HARRISON HEINRICH, OF BROOKLYN, NEW YORK

THEFTPROOF TIRE-VALVE CAP

Application filed March 30, 1929. Serial No. 351,144.

This invention relates to a device designed and adapted to prevent the theft of a cap applied to a tire valve stem.

The principal object of the invention is the provision of a simple and efficient device, which will be under the control of an authorized person, to make it possible to apply the usual cap to a valve stem, or to make it possible to remove said cap by such authorized person, but which may be employed to make it impossible for an unauthorized person to remove the cap.

With the foregoing object, other objects of the invention will appear from the embodiment of the invention, which by way of example, is described in the following specification, and illustrated in the accompanying drawing, in which Fig. 1 is a view partly in section and partly in elevation of a portion of a tire valve stem, and a device embodying the invention, the parts thereof being shown in a relationship which enables a cap to be applied, or to be removed from the stem;

Fig. 2 is a view similar to Fig. 1, but showing a relationship of parts preventing the removal of the cap; and Fig. 3 is a view of the key used for applying or removing the cap.

Referring now more particularly to the several views of the drawing, it will be apparent, that there is shown a portion of a tire valve stem 10 threaded as at 11 to receive the usual cap 12 which is adapted for threading engagement with the stem 10. The cap 12 is provided with the usual gasket 13 to seal the open end of the stem 10 by contact therewith when the cap 12 is applied to prevent leakage of air.

The device of the present invention includes a guard, shell, hollow body or supplemental cap 14 within which the cap 12 is arranged. The guard 14 is open at one end, as at 15 to accommodate the stem 10. The guard 14 is provided with an inturned circular edge or flange 16 interiorly of the open end thereof, which prevents the cap 12 from being separated from the guard 14. The cap 12 is slightly smaller in diameter than the diameter of the bore 17 in the guard 14, and is also shorter in length than the length of the said bore 17. It will therefore be apparent that the guard has rotatory and axial movement with respect to the cap 12. In order to cause the cap 12 to rotate with the guard 14 there is provided means presently to be described. The guard 14 has a tapped hole 18 in the closed end concentrally thereof. Use is made of a key 19 having a threaded portion 20, knurled portion 21 for the purpose of screwing the portion 20 into and out of the hole 18, and a bifurcated end portion 22 to accommodate a suitable implement for a similar purpose. It will now be apparent that when the threaded portion 20 of the key 19 is screwed into the hole 18, the end thereof projecting into the bore 17 will bear on the cap 12, causing relative movement of the cap 12 and the guard 14 in opposite directions, and as a consequence the cap 12 will be brought into engagement with the edge or flange 16. In this manner the cap 12 and the guard 14 are coupled together so that these parts will be rotatable as a unit, thereby enabling a person to screw the cap 12 on the stem 10. It will also be obvious that the cap 12 may be unscrewed from the stem 10 by using the key 19 in a similar manner. When the key 19 is removed, the guard 14 will rotate relatively to the cap 12, due to the fact that the edge or flange 16 will be disengaged from the cap 12. It will therefore be apparent that any attempt to remove the cap 12 will result in the mere free rotation of the guard 14 on the cap 12 without sufficient frictional contact therewith to cause the cap 12 to rotate with the guard 14. Consequently it will be impossible for an unauthorized person to remove the cap 12 when applied to the stem 10.

While there has been shown and described a practical and preferred means for attaining the objects of the invention, it is to be understood that changes and modifications may be made without departing from the spirit of the invention, the scope of which is limited only by the terms of the appended claim.

I claim:

The combination with an internally threaded valve stem cap, of a hollow member open at one end within which said cap is arranged, said member having rotatory and axial movement on said cap, said hollow member being provided with an interior edge on the open end, said edge preventing said cap from being separated from said hollow member, and a separate element for threading engagement with said hollow member and adapted when so engaged to bear on said cap, to bring said cap into engagement with said edge, to cause said cap to rotate with said hollow member, for the purpose of screwing said cap on a valve stem, said element being removable to release said cap from engagement with said edge, to allow said hollow member to rotate on said cap, to prevent said cap from being unscrewed from said stem.

Signed at New York in the county of New York and State of New York this 28th day of March, A. D. 1929.

HARRISON HEINRICH.